(12) United States Patent (10) Patent No.: US 12,593,267 B2
Maemoto et al. (45) Date of Patent: Mar. 31, 2026

(54) RADIO WAVE MAP GENERATOR DEVICE, RADIO WAVE MAP PROVIDER DEVICE, AND RADIO WAVE MAP ACQUIRING DEVICE

(71) Applicant: DENSO CORPORATION, Kariya-city (JP)

(72) Inventors: Daiki Maemoto, Kariya-city (JP); Tsuneo Nakata, Kariya-city (JP); Shigeki Kawai, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 357 days.

(21) Appl. No.: 18/298,272

(22) Filed: Apr. 10, 2023

(65) Prior Publication Data

US 2023/0247540 A1 Aug. 3, 2023

Related U.S. Application Data

(63) Continuation of application No. PCT/JP2021/032740, filed on Sep. 6, 2021.

(30) Foreign Application Priority Data

Oct. 23, 2020 (JP) ................................ 2020-178359

(51) Int. Cl.
| *H04W 48/16* | (2009.01) |
| *G01S 5/02* | (2010.01) |
| (Continued) | |

(52) U.S. Cl.
CPC ......... *H04W 48/16* (2013.01); *G01S 5/02521* (2020.05); *H04W 4/02* (2013.01); *H04W 48/20* (2013.01)

(58) Field of Classification Search
CPC ....... H04W 48/16; H04W 48/20; H04W 4/02; H04W 24/04; H04W 24/10; H04W 16/18; G01S 5/02521
See application file for complete search history.

(56) References Cited

U.S. PATENT DOCUMENTS

| 8,406,804 B2 | 3/2013 | Ishizu et al. |
| 2010/0128698 A1 | 5/2010 | Ishizu et al. |
| (Continued) | | |

FOREIGN PATENT DOCUMENTS

| JP | 2010124374 A | 6/2010 |
| JP | 2011097374 A | 5/2011 |
| (Continued) | | |

*Primary Examiner* — Shah M Rahman
(74) *Attorney, Agent, or Firm* — Harness, Dickey & Pierce, P.L.C.

(57) ABSTRACT

A radio wave map generator device includes a receiving unit, a communication speed calculation unit, a connection probability calculation unit, and a storage unit. The receiving unit is configured to receive pieces of probe information each of which contains location information, propagation environment information, and external communication device identification information. The communication speed calculation unit is configured to calculate a first communication speed, and a second communication speed. The connection probability calculation unit is configured to calculate a first connection probability, and a second connection probability. The storage unit is configured to store the location information, external communication device identification information, the first communication speed, the second communication speed, the first connection probability, and the second connection probability.

9 Claims, 7 Drawing Sheets

SERVER DEVICE 200 250

202 PROBE INFORMATION STORAGE UNIT

204 RADIO WAVE MAP STORAGE UNIT

203 CONTROL UNIT

206 COMMUNICATION SPEED CALCULATION UNIT

207 COMMUNICATION DELAY CALCULATION UNIT

208 CONNECTION PROBABILITY CALCULATION UNIT

209 MINIMUM GUARANTEED SPEED CALCULATION UNIT

210 EXPECTED SPEED CALCULATION UNIT

211 MINIMUM GUARANTEED COMMUNICATION DELAY CALCULATION UNIT

212 EXPECTED COMMUNICATION DELAY CALCULATION UNIT

201 RECEIVING UNIT

205 TRANSMISSION UNIT

(51) Int. Cl.
    *H04W 4/02*         (2018.01)
    *H04W 48/20*      (2009.01)

(56)        References Cited

U.S. PATENT DOCUMENTS

| 2012/0214496 | A1 | 8/2012 | Joko | |
| 2012/0263120 | A1* | 10/2012 | Gopalakrishnan | H04W 72/54 |
| | | | | 370/329 |
| 2016/0192382 | A1 | 6/2016 | Soldati et al. | |
| 2017/0223733 | A1* | 8/2017 | Nakata | H04W 72/51 |
| 2018/0007603 | A1* | 1/2018 | Miranda | H04W 52/365 |
| 2018/0279199 | A1* | 9/2018 | Karakkad Kesavan | |
| | | | Namboodiri | H04W 48/16 |
| 2019/0037413 | A1* | 1/2019 | Wang | H04W 48/20 |
| 2019/0317913 | A1* | 10/2019 | Iwamoto | H04M 1/724097 |
| 2020/0037301 | A1* | 1/2020 | Park | H04W 72/0453 |
| 2020/0186980 | A1* | 6/2020 | Furuyama | H04W 60/00 |
| 2020/0260405 | A1* | 8/2020 | Koudouridis | H04W 4/02 |
| 2021/0070317 | A1 | 3/2021 | Hitotsumatsu et al. | |
| 2021/0204164 | A1* | 7/2021 | Yavuz | H04L 47/781 |
| 2021/0219114 | A1* | 7/2021 | Otaka | H04W 4/48 |
| 2021/0356554 | A1* | 11/2021 | Mizuno | G05D 1/0278 |
| 2022/0034989 | A1* | 2/2022 | Kitsunezuka | H04W 4/025 |
| 2022/0035050 | A1* | 2/2022 | Nakade | G01S 19/426 |
| 2022/0176975 | A1* | 6/2022 | Nakamura | H04W 40/026 |
| 2023/0067775 | A1* | 3/2023 | Sakashita | H04W 48/04 |

FOREIGN PATENT DOCUMENTS

| JP | 2016530828 A | 9/2016 | | |
| JP | 2019203823 A | 11/2019 | | |
| KR | 20170117270 A | * 10/2017 | | G06F 9/455 |
| WO | WO-2017/152410 A1 | 9/2017 | | |

* cited by examiner

FIG. 4A

| LOCATION (LATITUDE, LONGITUDE) | TIME | CONNECTED BASE STATION | COMMUNICATION SPEED | COMMUNICATION DELAY VALUE | CONNECTION PROBABILITY |
|---|---|---|---|---|---|
| o (34.9910, 137.014) | 9:00-12:00 | BASE STATION A | 1.4Mbps | 110ms | 1.0 |
| p (34.9915, 137.009) | 9:00-12:00 | BASE STATION A | 1.5Mbps | 100ms | 0.7 |
| p (34.9915, 137.009) | 9:00-12:00 | BASE STATION B | 0.9Mpps | 150ms | 0.3 |
| q | . . . | BASE STATION A | . . . | . . . | . . . |
| r | . . . | BASE STATION A | . . . | . . . | . . . |
| r | . . . | BASE STATION B | . . . | . . . | . . . |
| r | . . . | BASE STATION C | . . . | . . . | . . . |

FIG. 4B

| RADIO WAVE INTENSITY (RSRP [dBm]) | DOWNLINK COMMUNICATION SPEED (Mbps) | UPLINK COMMUNICATION SPEED (Mbps) |
|---|---|---|
| -60dBm | 15 | 30 |
| -70dBm ~ -60dBm | 10 | 20 |
| -80dBm ~ -70dBm | 8 | 15 |
| -90dBm ~ -80dBm | 6 | 10 |
| -100dBm ~ -90dBm | 4 | 7 |
| -110dBm ~ -100dBm | 2 | 5 |
| -110dBm | 1 | 1 |

FIG. 5A

| LOCATION (LATITUDE, LONGITUDE) | TIME | COMMUNICATION SPEED | COMMUNICATION DELAY VALUE |
|---|---|---|---|
| . . . | . . . | . . . | . . . |
| p (34.9915, 137.009) | 9:00-12:00 | 0.9Mbps | 150ms |
| . . . | . . . | . . . | . . . |

FIG. 5B

| LOCATION (LATITUDE, LONGITUDE) | TIME | COMMUNICATION SPEED | COMMUNICATION DELAY VALUE |
|---|---|---|---|
| . . . | . . . | . . . | . . . |
| p (34.9915, 137.009) | 9:00-12:00 | 1.3Mbps | 115ms |
| . . . | . . . | . . . | . . . |

RADIO WAVE MAP GENERATOR DEVICE, RADIO WAVE MAP PROVIDER DEVICE, AND RADIO WAVE MAP ACQUIRING DEVICE

CROSS REFERENCE TO RELATED APPLICATION

The present application is a continuation application of International Patent Application No. PCT/JP2021/032740 filed on Sep. 6, 2021, which designated the U.S. and claims the benefit of priority from Japanese Patent Application No. 2020-178359 filed on Oct. 23, 2020. The entire disclosures of all of the above applications are incorporated herein by reference.

TECHNICAL FIELD

The present disclosure relates to a device relative to a radio wave map such as a probe information transmitter and a radio wave map acquiring device mainly mounted in a moving body, a radio wave map generator and a radio wave map provider device mainly performed in a server, a method performed by these devices and a program executable by these devices.

BACKGROUND

As wireless communications become more widespread, there are more and more opportunities to communicate using wireless communications in a variety of locations. In particular, regarding a moving body such as an automobile, attention is being paid to technologies that perform driving assistance and automated driving control using high-capacity cellular communication, V2X such as vehicle-to-vehicle communication and road-to-vehicle communication. Along with this, vehicles have come to be equipped with a communication function, and the vehicles are becoming more connected. Radio waves interfere with each other in wireless communication, and accordingly transmission levels and receiving level of radio waves vary depending on the location. Such phenomenon is generally called fading. Since moving bodies such as automobiles are assumed to move, a communication quality changes with the movement. Therefore, it is possible to take measure in advance by assessing a communication quality at a certain location in advance.

SUMMARY

A first aspect of the present disclosure is a radio wave map generator device configured to receive probe information from a probe information transmitter device mounted in a moving body and generate a radio wave map. The radio wave map generator device includes a receiving unit, a communication speed calculation unit, a connection probability calculation unit, and a radio wave map storage unit. The receiving unit is configured to receive pieces of the probe information each of which contains location information indicating a position of the moving body, propagation environment information of a radio propagation channel used for wireless communication between the moving body and an external communication device at the position, and external communication device identification information identifying the external communication device. The communication speed calculation unit is configured to calculate, based on the pieces of the probe information when the external communication device which communicates with the moving body at the position is a first external communication device and a second external communication device, a first communication speed from first propagation environment information that is the propagation environment information of the radio propagation channel between the moving body and the first external communication device, and a second communication speed from second propagation environment information that is the propagation environment information of the radio propagation channel between the moving body and the second external communication device. The connection probability calculation unit is configured to calculate, based on the pieces of the probe information, a first connection probability that is a probability of performing wireless communication with the first external communication device at the position, and a second connection probability that is a probability of performing wireless communication with the second external communication device at the position. The radio wave map storage unit is configured to store the location information, the external communication device identification information, the first communication speed, the second communication speed, the first connection probability, and the second connection probability.

A second aspect of the present disclosure is a radio wave map provider device configured to receive a radio wave map request from a radio wave map acquiring device mounted in a moving body, and transmit required information. The radio wave map provider device includes a radio wave map storage unit, a receiving unit, a minimum guaranteed speed calculation unit, an expected speed calculation unit, and a transmission unit. The radio wave map storage unit is configured to store reference position information indicating a reference position, a first communication speed that is a communication speed between a moving body and a first external communication device at the reference position, a second communication speed that is a communication speed between the moving body and a second external communication device at the reference position, a first connection probability that is a probability of performing wireless communication with the first external communication device at the reference position, and a second connection probability that is a probability of performing wireless communication with the second external communication device at the reference position. The receiving unit is configured to receive the radio wave map request that contains request position information indicating a request position and usage information indicating a usage of the radio wave map. The minimum guaranteed speed calculation unit is configured to select, as minimum guaranteed speed information, a smaller one of the first communication speed and the second communication speed for the reference position corresponding to the request position information when the usage information indicates real-time communication. The expected speed calculation unit is configured to calculate, when the usage information indicates non-real-time communication other than the real-time communication, expected speed information that is an expected value of the communication speed using the first connection probability, the second connection probability, the first communication speed, and the second communication speed for the reference position corresponding to the request position information. The transmission unit is configured to transmit a radio wave map reply that contains the minimum guaranteed speed information or the expected speed information.

A third aspect of the present disclosure is a radio wave map acquiring device mounted in a moving body. The radio wave map acquiring device includes a request position information generating unit, a usage information generation unit, a transmission unit, a receiving unit, and a wireless communication unit. The request position information generating unit is configured to determine a request position and generate request position information. The usage information generation unit is configured to generate usage information indicating usage of a radio wave map. The transmission unit is configured to transmit, to a radio wave map provider device, a radio wave map request that contains the request position information and the usage information. The receiving unit configured to receive, from the radio wave map provider device, a radio wave map reply that contains minimum guaranteed speed information for a reference position corresponding to the request position information when the usage information indicates real-time communication, and the radio wave map reply that contains expected speed information for the reference position corresponding to the request position information when the usage information indicates non-real-time communication other than the real-time communication. The wireless communication unit is configured to perform wireless communication with an external communication device based on the minimum guaranteed speed information or the expected speed information contained in the radio wave map reply.

BRIEF DESCRIPTION OF THE DRAWINGS

FIG. 4A is a diagram illustrating a radio wave map generated in the embodiment of the present disclosure.

FIG. 4B is a diagram illustrating a radio wave map generated in the embodiment of the present disclosure.

FIG. 5A is a diagram illustrating a radio wave map provided in the embodiment of the present disclosure.

FIG. 5B is a diagram illustrating a radio wave map provided in the embodiment of the present disclosure.

EMBODIMENTS

Figure 1:
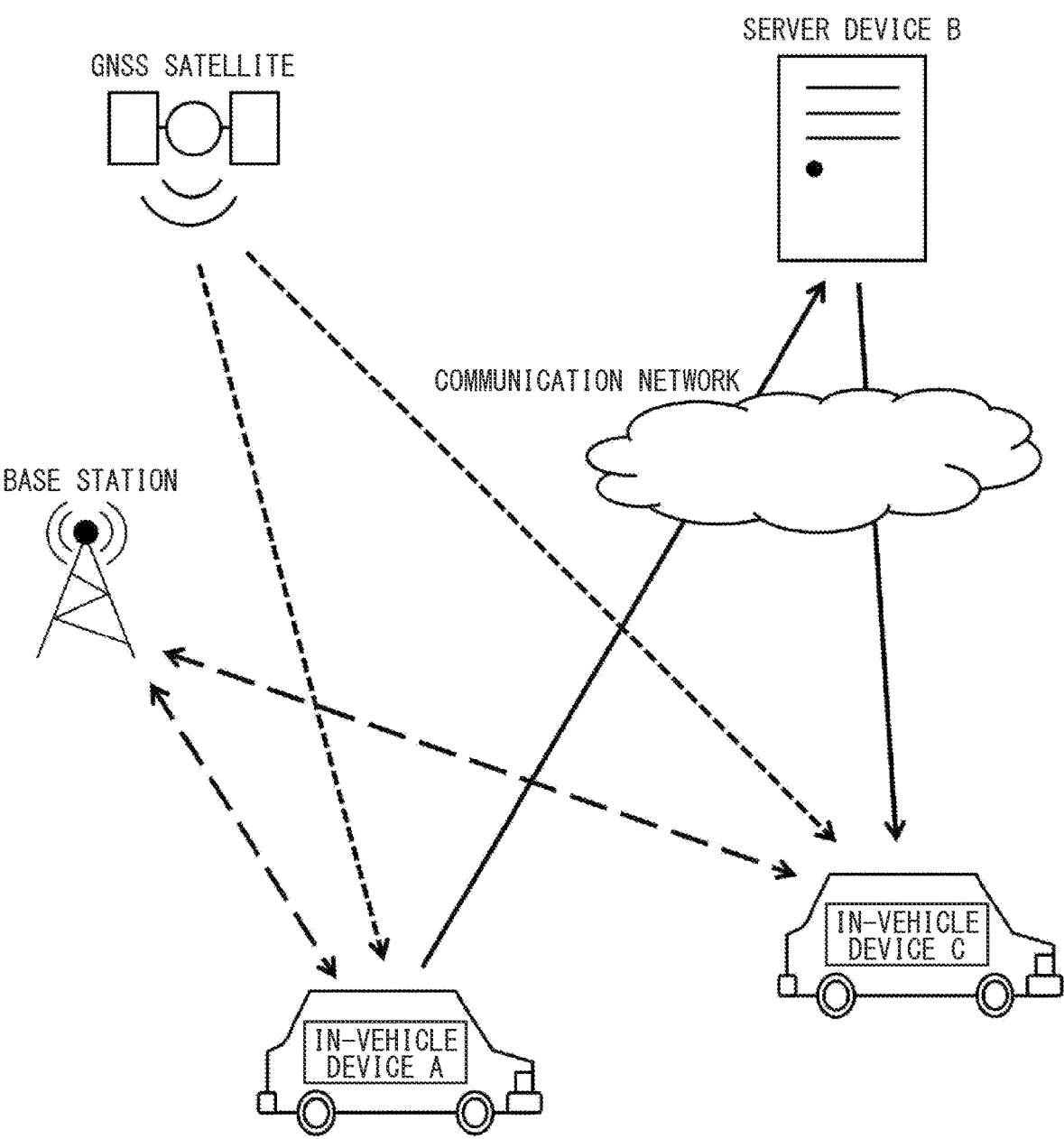
FIG. 1 is a diagram showing an overall configuration according to an embodiment of the present disclosure.

An embodiment of the present disclosure will be described below with reference to the drawings.

The present invention referred hereinafter indicates the invention described in the claims, and is not limited to the following embodiments. Further, at least words inside the double quotation means words and phrases described in the claims, and are not limited to the following embodiments.

Configurations and methods descried in dependent claims should be interpreted as arbitrary configurations and arbitrary methods within descriptions in independent claim. Configurations and methods of following embodiments corresponding to configurations and methods described in dependent claims, and configurations and methods described only in the following embodiments without descriptions in claims should be interpreted as arbitrary configurations and arbitrary methods in this disclosure. In a case that the scope of claims is broader than descriptions of the embodiments, configurations and methods described in the following embodiments are just examples of configurations and methods of the present disclosure, which should be interpreted as arbitrary configurations and arbitrary methods in this disclosure. In any cases, essential configurations and methods of this disclosure should be interpreted based on independent claims.

Any effects described in the embodiments are effects obtained by a configuration of an embodiment as an example of this disclosure, and are not necessarily effects of this disclosure.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

The problem described in this disclosure is not a publicly known problem, but person including the inventor has independently found out, and is a fact that affirms the inventive step of the invention together with the configuration and method of the present disclosure.

1. Embodiment (1) Overall Configuration Including Related Devices

An overall configuration including devices related in the present embodiment and their interrelationships will be described with reference to FIG. 1.

An in-vehicle device A and an in-vehicle device C mounted in a vehicle, which is a moving body, are connected with a server device B. The moving body refers to a movable object, and a travel speed is not limited. Naturally, this also includes a case where the mobile object is stopped. For example, the moving body includes, but is not limited to, vehicles, motorcycles, bicycles, pedestrians, ships, aircraft, and objects mounted on these. The term "mounted" includes not only a case where an object is directly fixed to the mobile object but also a case where an object is moved together with the mobile object although the object is not fixed to the mobile object. For example, the log management device 100 may be carried by a person on the moving body, or the log management device 100 may be mounted on a load placed on the moving body.

The in-vehicle device A corresponds to a probe information transmitter 100 of the present embodiment and is configured to transmit, via a communication network, probe information which is necessary to generate radio wave map.

The server device B corresponds to a radio wave map generator 200 of the present embodiment and is configured to receive the probe information from the in-vehicle device A via the communication network to and generate or update the radio wave map based on the probe information. The radio wave map refers to a state of a radio wave propagation path at a specific location or a set of estimation results, for example, a mapping of RSSI for each grid point on the map.

The server device B corresponds to a radio wave map provider device 250 of the present embodiment and is configured to receive radio wave map request from the in-vehicle device C via the communication network to transmit a radio wave map reply, which is information according to contents of the radio wave map request, to the in-vehicle device C via the communication network.

The in-vehicle device C corresponds to a radio wave map acquiring device 150 of the present embodiment and is configured to transmit the radio wave map request to the server device B via the communication network to receive the radio wave map reply, which is information according to the contents of the radio wave map request, from the server device B via the communication network.

The in-vehicle device A and the in-vehicle device C are configured to receive a location signal from GNSS and acquire position information of themselves.

The in-vehicle device A and the in-vehicle device C are configured to communicate with base stations.

In FIG. 1, the wireless communication with the base stations is shown as a different communication from the communication via the communication network. However, the wireless communication and the communication via the communication network may be the same. That is, the in-vehicle device A and the in-vehicle device C may be connected with the server device B using the wireless communication via the base station.

The wireless communication network with the base station is, for example IEEE802.11 (WiFi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, or 5G. Alternatively, Dedicated Short Range Communication (DSRC) may be used.

In addition to the aforementioned wireless communication methods, communication networks can also use wired communication methods. For example, a local area network (LAN), the Internet, or a fixed telephone line may be used. The wired communication methods are used in a case where the vehicle is parked in a parking lot at home or other place, a case where the vehicle is housed in a repair shop, and the like.

A combination of the wireless communication system and the wired communication system may be used as the communication network. For example, the in-vehicle device A and a base station device in a cellular system may be connected with the base station via the wireless communication system, and the base station device may be connected with other devices via the wired communication system such as a core line of a communication carrier or the Internet.

Although the in-vehicle device A and the in-vehicle device C are mounted in different vehicles in the present embodiment, they may be mounted in one vehicle. In such a case, the in-vehicle device A and the in-vehicle device C may be provided as different devices, or alternatively one in-vehicle device may have the function of the probe information transmitter 100 that is the in-vehicle device A and the function of the radio wave map acquiring device 150 that is the in-vehicle device 150.

The server device B of the present embodiment has the functions of the radio wave map generator 200 and the radio wave map provider device 250. However, these functions may be performed by different server devices.

(2) Configurations of In-Vehicle Devices (Probe Information Transmitter 100 and Radio Wave Map Acquiring Device 150)

Configurations of the in-vehicle devices of the present embodiment will be described with reference to FIG. 2. In the present embodiment, an example where the in-vehicle device has the functions of the probe information transmitter 100 and the radio wave map acquiring device 150 will be described.

The in-vehicle device includes a location information acquiring unit 101, a wireless communication unit 102, a propagation environment information acquiring unit 103, a control unit 104, a transmission unit 105, a receiving unit 106, an application 107, and a storage unit 108. The control unit 104 is configured to build a probe information generation unit 109, a request position information generating unit 110, and a usage information generation unit 111.

The in-vehicle device may include a general-purpose central processing unit (CPU), a volatile memory such as a RAM, a non-volatile memory such as a ROM, a flash memory, or a hard disk, various interfaces, and an internal bus connecting the constituents to each other. Then, by executing software on these hardware, the log management device 100 can be configured to perform the functions of each functional block described in FIG. 2. The same applies to the server device illustrated in FIG. 3 that will be described later. Of course, the in-vehicle device may be implemented by dedicated hardware such as an LSI.

As the in-vehicle device, a form of an electronic control device (electronic control unit (hereinafter abbreviated to ECU)) as a semifinished product in the present embodiment is supposed, but the present disclosure is not limited thereto. For example, a form of a component may be a semiconductor circuit or a semiconductor module, and a form of a finished product may be a personal computer (PC), a smartphone, a cellular phone, or a navigation system. The in-vehicle device may include multiple ECUs in addition to a single ECU. For example, a communication ECU may perform communication with the outside. The probe information transmitter 100 and the radio wave map acquiring device 150 may be configured by different ECUs.

Figure 2:
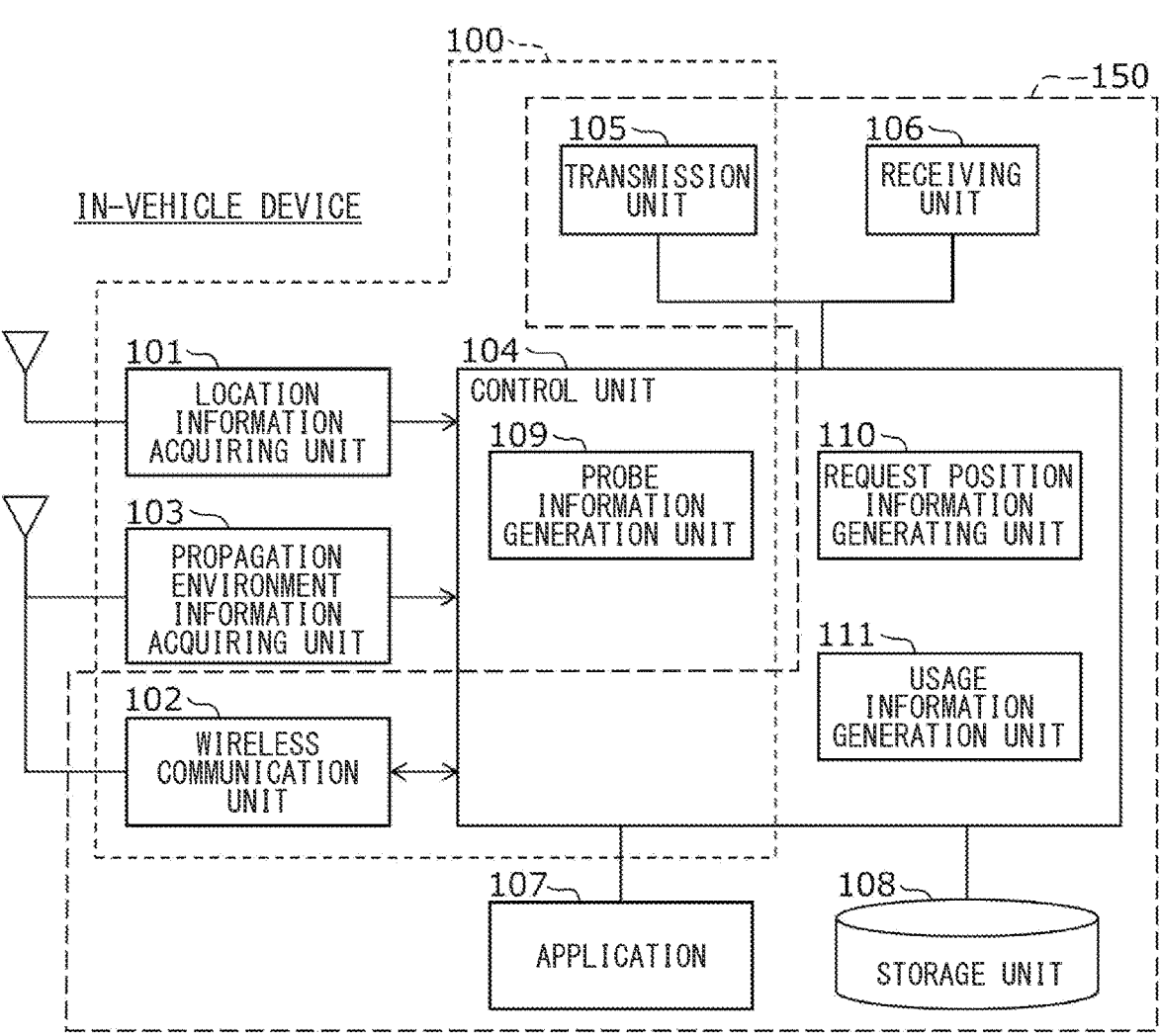
FIG. 2 is a block diagram illustrating a probe information transmitter and a radio wave map acquiring device which are in-vehicle devices according to the embodiment of the present disclosure.

The blocks of the in-vehicle device shown in FIG. 2 includes blocks mainly used by the probe information transmitter 100, blocks mainly used by the radio wave map acquiring device 150, and blocks used by the probe information transmitter 100 and the radio wave map acquiring device 150. Hereinafter, blocks used by the probe information transmitter 100 will be described first, and then blocks used by the radio wave map acquiring device 150 will be described.

The blocks used by the probe information transmitter 100 will be described.

The location information acquiring unit 101 is configured to acquire location information indicating the current position of the vehicle. The location information acquiring unit 101 mainly consists of a positioning receiver of a satellite positioning (GNSS) device. A positioning receiver corresponding to the satellite system to be used should be provided. The location information acquiring unit 101 includes devices configured to provide correction information used for correcting the location information in addition to the positioning receiver. For example, the location information acquiring unit 101 may include inertial sensors such as a gyro sensor and an acceleration sensor, a laser sensor, and a map information database. Positioning accuracy depends on the positioning method of the satellite system, the type of data used for correction, and the results of positioning calculations. For example, a single point positioning method such as GPS always contains an error of 1 m to 10 m. On the other hand, there are positioning methods with errors of less than 1 meter or 10 cm, such as relative positioning, differential GPS (DGPS), real time kinematic (RTK)-GPS positioning, and network RTK-GPS positioning. The less than 10 cm class includes RTK-GNSS/PPP-AR (Quasi-Zenith Satellite MADOCA system) and PPP-RTK (Quasi-Zenith Satellite CLAS system). The positioning accuracy can be improved to less than 1 m class or less than 10 cm class by using gyro navigation or laser sensor together with the single positioning method. The less than 1 m class includes SLAS (sub-meter level positioning augmentation service) method using corrected data. In addition, when a FIX solution is obtained in the positioning calculation, the positioning accuracy of less than 1 m class or less than 10 cm class may be obtained even if the accuracy of the positioning method used is low. Even when a FLOAT solution is obtained, positioning accuracy of the less than 1 m class may be obtained if the accuracy of the positioning method used is high. FIX solutions and FLOAT solutions exist in positioning solutions in the method of performing AR (Ambiguity Resolution). Hereinafter, the less than 10 m class is described as 1 m or more, the less than 1 m class is described as between 10 cm and 1 m, the less than 10 cm class is described as 10 cm or less.

The wireless communication unit 102 is configured to transmit necessary information to and receive necessary information from external communication device, e.g. the base station in the present embodiment, using wireless communication. In the present embodiment, the external communication device is the base station using cellular communication method such as eNB. However, the external communication device may be another vehicle or a roadside device when Wi-Fi, AP, or V2X is used. Of course, a plurality of communication methods may be used. The wireless communication here is a transmitting and/or receiving signals wirelessly.

The propagation environment information acquiring unit 103 is configured to acquire propagation environment information of radio propagation channel used by the wireless communication unit 102 in the wireless communication at the current position of the vehicle acquired by the location information acquiring unit 101. For example, the propagation environment information acquiring unit 103 may be a device configured to measure wave intensity of reference signals. The propagation environment information indicates the state or estimated result of the radio propagation channel and includes RSSI, RSRP, RSRQ, SNR, SIR, BER, propagator, channel propagation matrix, and an average bit rate per unit of time (bits/s), for example. The propagation environment information acquiring unit 103 may be configured to acquire the propagation environment information from the external communication device or the like or acquire the propagation environment information generated by the probe information transmitter.

The propagation environment information acquiring unit 103 may be configured to acquire information about the reception status in the frequency band allocated to the downlink to acquire information for evaluating the reception quality of the downlink. For example, such information includes RSSI, RSRP, and RSRQ of the reference signal. The radio wave map generator 200 of the server device can generate or update the reception radio wave map of the specific location on a map by using such information. The propagation environment information acquiring unit 103 may be configured to acquire information about the transmission status in the frequency band allocated to the uplink to acquire information for evaluating the reception quality of the uplink. For example, the average transmission bit rate (bits/s) per unit of time corresponds to such information. Alternatively, the propagation environment information acquiring unit 103 may be configured to receive, from the base station, RSSI, RISP, RSRQ of the reference signal measured by the base station. The radio wave map generator 200 of the server device can generate or update the transmission radio wave map of the specific location on a map by using such information.

The propagation environment information acquiring unit 103 is configured to acquire, in addition to the propagation environment information, an external communication device identification information that identifies the base station. The external communication device identification information is, for example, a base station ID assigned to each base station. The propagation environment information acquiring unit 103 is configured to acquire the base station ID contained in a packet when the propagation environment information acquiring unit 103 decodes the packet transmitted from the base station. The propagation environment information acquiring unit 103 may be configured to acquire the external communication device identification information from the external communication device or the like or acquire the external communication device identification information generated by the probe information transmitter.

The propagation environment information acquiring unit 103 may further acquire band information indicating the frequency band of the radio propagation channel used for the wireless communication. When the wireless communication method is LTE, for example, the band information is distinguished by assigning numbers such as band 1 and band 2 according to the frequency band and the duplex mode. The propagation environment information acquiring unit 103 is configured to acquire the band information contained in a packet when the propagation environment information acquiring unit 103 decodes the packet transmitted from the base station. Since the characteristics of the radio propagation channel change when the frequency band changes, the status of the radio propagation channel can be represented more accurately by generating the radio wave map containing the band information.

The wireless communication unit 102 may have all or a part of the functions of the propagation environment information acquiring unit 103 described above. The propagation environment information acquired and output by the propagation environment information acquiring unit 103 may be obtained as normalized relative values instead of absolute values of the measurement results of each value. For example, the propagation environment information may be a normalized value where the maximum speed that can be drawn under ideal communication conditions with no radio interference is 100 and the minimum is 0.

The control unit 104 is configured to control the location information acquiring unit 101, the wireless communication unit 102, the propagation environment information acquiring unit 103, the transmission unit 105, the receiving unit 106, the application 107, and the storage unit 108. The control unit 104 is configured to build the probe information generation unit 109, the request position information generating unit 110, and the usage information generation unit 111.

The probe information generation unit 109 is configured to generate probe information that containing the location information acquired by the location information acquiring unit 101, and the propagation environment information and the external communication device identification information acquired by the propagation environment information acquiring unit 103. When the propagation environment information acquiring unit 103 is configured to acquire the band information, the probe information may contain the band information.

The transmission unit 105 is configured to transmit the probe information generated by the probe information generation unit 109 to the radio wave map generator 200. For example, in the present embodiment, the transmission unit 105 is configured to transmit the following information as the probe information.

(Probe Information)

Timestamp: Time (UTC) when the probe information was generated

Location information: Coordinates determined by GNSS, latitude/longitude/altitude (WGS-84), or ID representing a grid point on the map Positioning accuracy information: Grade of positioning accuracy [1 m or more/10 cm to 1 m/less than 10 cm]

Communication system ID: Base station ID, Band information

Radio wave intensity (propagation environment information): relative value of the received signal strength indicator (RSSI)

The probe information other than the above information may be transmitted. The probe information may be generated by a specific block other than the control unit 104.

Since the probe information transmitter 100 of the present embodiment is configured to transmit the external communication device identification information identifying the external communication device, the radio wave map generator 200 that received the external communication device identification information can generate the radio wave map in consideration of the external communication device. Since the probe information transmitter 100 is configured to transmit the band information, the radio wave map generator 200 that received the band information can generate the radio wave map in consideration of the band used for the communication in addition to the external communication device. Since the propagation environment information is calculated as the normalized relative value, the ratio of the capability of each device can be used as an index, and accordingly each device can use the propagation environment information without correcting variation in the devices.

Next, blocks used in the radio wave map acquiring device 150 will be described. The request position information generating unit 110 is configured to determine, as request position, a physical position at which the radio wave map acquiring device 50 as the in-vehicle device uses wireless communication, and generate request position information. The request position may be the current position, for example, or the position where the vehicle will travel based on the traveling schedule. When the traveling schedule is used, one or more positions where the vehicle will arrive within a certain period of time based on the current vehicle speed may be the request positions. In the case where the number of the request positions is more than one, for example, positions may be selected at regular time intervals or at regular distance intervals.

The usage information generation unit 111 is configured to generate usage information indicating the usage of the radio wave map. The usage information is generated according to the purpose and function of the application described later. For example, when the application 107 is a program on a terminal of a remote vehicle monitoring system, the monitoring device is necessary to acquire vehicle information such as the image of in-vehicle camera or vehicle speed in low latency, or real time. Therefore, the usage information generation unit 111 sets 1 to the flag indicating real-time communication. When the application 107 is a big data transmission program that collectively transmits data acquired from the in-vehicle sensors, it is not necessary to communicate in real time, but rather to transmit the data at low cost. Therefore, the usage information generation unit 111 sets 0 to the flag indicating real-time communication.

In the present embodiment, the usage information generation unit 111 uses the flag indicating real-time communication. However, the usage information generation unit 111 may be configured to transmit information indicating the type of the application.

The transmission unit 105 is configured to transmit the radio wave map request containing the request position information generated by the request position information generating unit 110 and the usage information generated by the usage information generation unit 111 to the radio wave map provider device 250. For example, in the present embodiment, the following information is transmitted as the radio wave map request.

(Radio Wave Map Request)

Request position information: ID indicating latitude/longitude/altitude (WGS-84) or grid point on map Usage information: real-time communication flag (1: ON, 0: OFF)

The radio wave map provider device 250 that received the radio wave map request selects information of the radio wave map to be transmitted based on the usage information contained in the radio wave map request, and transmit it as the radio wave map reply as the radio wave map acquiring device 150. The details of the operation of the radio wave map provider device 250 will be described later.

The receiving unit 106 is configured to receive the radio wave map reply from the radio wave map provider device 250. Specifically, when the usage information contained in the radio wave map request indicates the real-time communication, the receiving unit 106 receives the radio wave map reply containing the minimum guaranteed speed information at the reference position corresponding to the request position information. When the usage information contained in the radio wave map request indicates non-real-time communication, the receiving unit 106 receives the radio wave map reply containing the expected speed information at the reference position corresponding to the request position information. When the usage information contained in the radio wave map request indicates the real-time communication, the receiving unit 106 may receive the radio wave map reply containing the maximum guaranteed delay information at the reference position corresponding to the request position information. When the usage information contained in the radio wave map request indicates non-real-time communication, the receiving unit 106 may receive the radio wave map reply containing the expected communication delay information at the reference position corresponding to the request position information. The minimum guaranteed speed information, the expected speed information, the maximum guaranteed delay information, and the expected communication delay information will be described in the description of the configuration and the operation of the radio wave map provider device 250. Since the received minimum guaranteed speed information, expected speed information, maximum guaranteed delay information, and expected communication delay information are a part of the radio wave map selected by the radio wave map provider device 250, these may be referred to as the radio wave map. For example, in the present embodiment, the following information is transmitted as the radio wave map reply.

(Radio Wave Map Reply)

Timestamp: Time (UTC) when the radio wave map was generated

Reference position information: ID indicating latitude/longitude/altitude (WGS-84) or grid point on map Positioning accuracy information: Grade of positioning accuracy [1 m or more/10 cm to 1 m/less than 10 cm]

Communication system ID: Base station ID, Band information

Reference propagation environment information: Minimum guaranteed speed information or expected speed information, and maximum guaranteed delay information or expected communication delay information Valid time: Time when the reference propagation environment information is valid (per 15 minutes)

The storage unit 108 is configured to store the received radio wave map reply. Since the set of reference position information and reference propagation environment information stored in the storage unit 108 is a part of the radio wave map stored in the radio map provider device 250, it can be said that a replica of the radio wave map is stored in the storage unit 108. Since the replica is stored in the storage unit 108 for a certain period of time, it is possible to reduce the time of accessing the radio wave map provider device 250 in response to the radio wave map request. Alternatively, information that has expired may be discarded. This helps to maintain the freshness of the replica of the radio wave map above a certain level.

The application 107 is an application that uses the wireless communication unit 102. For example, the application 107 may be a program on a terminal the remote vehicle monitoring system or a big data transmission program as described above.

The wireless communication unit 102 is configured to wirelessly communicate with the external communication device based on the radio wave map reply received by the receiving unit 106. When the radio wave map reply contains the minimum guaranteed speed information or the maximum guaranteed delay information, data volume transmitted by the wireless communication is changed based on these information. For example, when the minimum guaranteed speed information is low, the monitoring cannot receive data in real time if the transmitted data volume is large. Accordingly, the data volume is reduced by changing resolution or compression rate of the data to be transmitted, or changing the encoding method. This makes it possible to transmit the data with low delay. When the radio wave map reply contains the expected speed information or the expected communication delay information, the data is performed at positions where a communication speed above a certain level or a communication delay below a certain level can be obtained based on these information. This makes it possible to reduce time for data transmission and communication cost.

The radio wave map may specify the transmission radio wave map for uplink or reception radio wave map for downlink as the radio wave map. In the present embodiment, the reception radio wave map is acquired. The transmission radio wave map is used for the evaluation of the radio propagation channel of uplink, and the reception radio wave map is used for the evaluation of the radio wave map of downlink. When the propagation environments of uplink and downlink can be evaluated to be the same, the reception radio wave map may be used for the evaluation of uplink, and the transmission radio wave map may be used for the evaluation of downlink. For example, such cases include TDD mode where the same frequency band is used for uplink and downlink. Further, such cases include a case where the same change can be predicted in uplink and downlink due to obstacles such as buildings.

Since the radio wave map acquiring device 150 of the present embodiment is configured to transmit the radio wave map request containing the usage information, the reference propagation environment information according to the characteristics of the application 107 of the radio wave map acquiring device 150 can be acquired. Further, since the information indicating real-time communication is used as the usage information, the communication with low delay and the communication for low cost can be selectively used.

(3) Configurations of Server Device (Radio Wave Map Generator 200, Radio Wave Map Provider Device 250)

Configurations of the server device of the present embodiment will be described with reference to FIG. 3. In the present embodiment, an example where the server device has the functions of the radio wave map generator 200 and the radio wave map provider device 250 will be described.

The server device includes the receiving unit 201, the probe information storage unit 202, the control unit 203, the radio wave map storage unit 204, and the transmission unit 205. The control unit 203 is configured to build a communication speed calculation unit 206, a communication delay calculation unit 207, a connection probability calculation unit 208, a minimum guaranteed speed calculation unit 209, an expected speed calculation unit 210, a maximum guaranteed communication delay calculation unit 211, and an expected communication delay calculation unit 212.

In the present embodiment, as the server device 200, a form of a server device as a finished product is supposed, but the present disclosure is not limited thereto. For example, a form of a component may be a semiconductor circuit or a semiconductor module, a form of a semi-finished product may be an ECU, and a form of a finished product may be a personal computer (PC), a workstation, a smartphone, or a cellular phone.

The server device may be mounted in a moving body. When the server device is mounted in a moving body, the server device is implemented in the vehicle-to-vehicle communication in which the vehicles directly communicate with each other or the vehicle-to-vehicle communication in which the vehicles indirectly communicate with each other via the base station.

Figure 3:
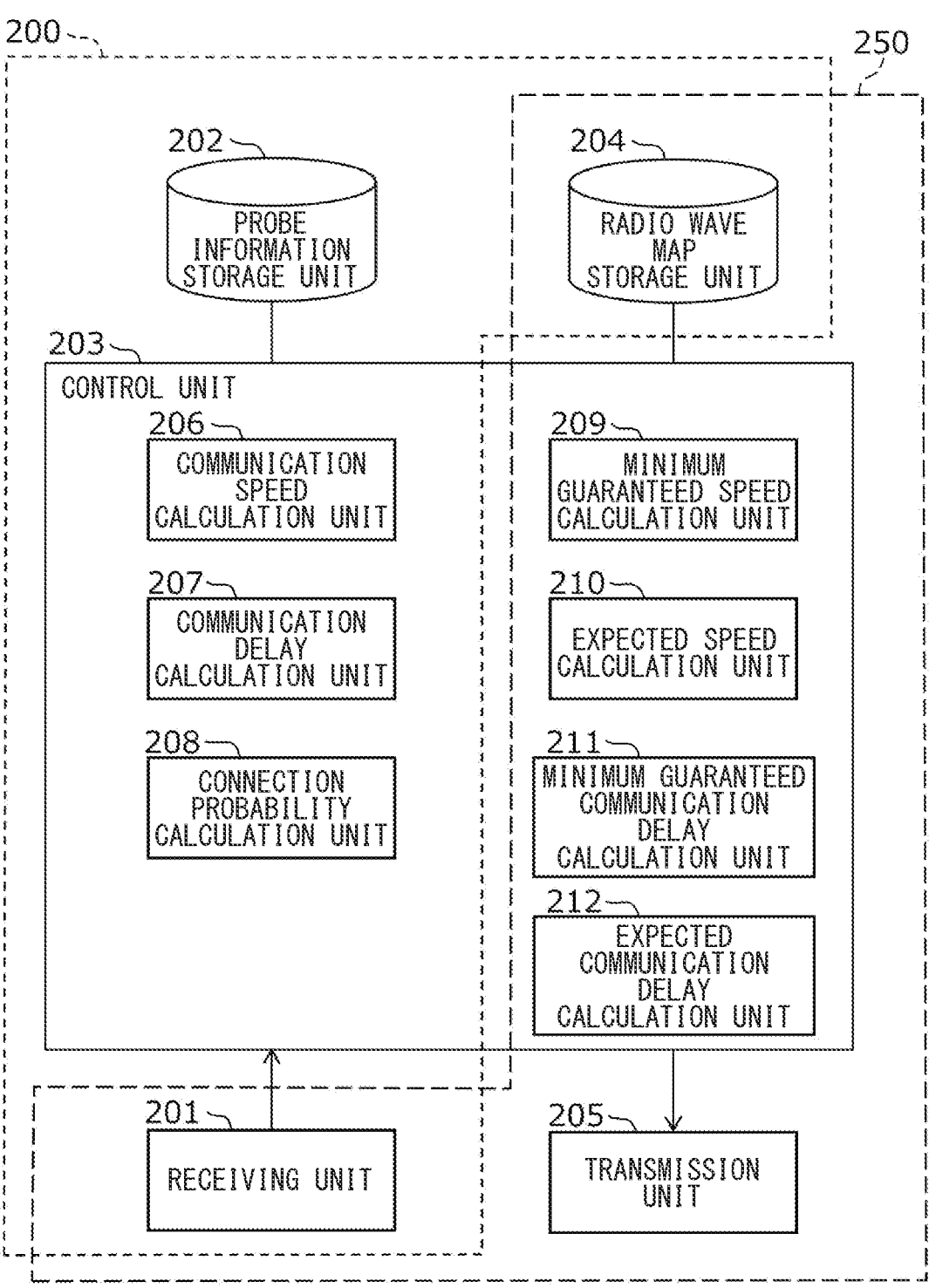
FIG. 3 is a block diagram illustrating a radio wave map generator and a radio wave map provider device which are in-vehicle devices according to the embodiment of the present disclosure.

The blocks of the server device shown in FIG. 3 includes blocks mainly used in the radio wave map generator 200, blocks mainly used in the radio wave map provider device 250, and blocks used in both the radio wave map generator 200 and the radio wave map provider device 250. Hereinafter, blocks used by the radio wave map generator 200 will be described first, and then blocks used by the radio wave map provider device 250 will be described.

Blocks used in the radio wave map generator 200 will be described. The receiving unit 201 is configured to receive pieces of the probe information each of which includes the location information indicating the position of the vehicle which is the moving body, the propagation environment information of the radio propagation channel used for the wireless communication between the vehicle and the external communication device at that position, and the external communication device identification information identifying the base station. The pieces of the probe information may be received from the same vehicle or multiple vehicles. The probe information used in the present embodiment is the same as described above in (2).

The probe information storage unit 202 is configured to store the probe information received by the receiving unit

201. The probe information storage unit 202 keeps all probe information received in the past unless the information is deleted.

The control unit 203 is configured to control the operation of the receiving unit 201, the probe information storage unit 202, the radio wave map storage unit 204, and the transmission unit 205. The control unit 203 is configured to build a communication speed calculation unit 206, a communication delay calculation unit 207, a connection probability calculation unit 208, a minimum guaranteed speed calculation unit 209, an expected speed calculation unit 210, a maximum guaranteed communication delay calculation unit 211, and an expected communication delay calculation unit 212.

The functions of the communication speed calculation unit 206, the communication delay calculation unit 207, the connection probability calculation unit 208, and the radio wave map 204 will be described with reference to the radio wave map generated in the present embodiment using FIG. 4A. FIG. 4A is a diagram showing the radio wave map of the present embodiment stored in the radio wave map storage unit 204.

The communication speed calculation unit 206 is configured to read the probe information stored in the probe information storage unit 202 and calculate the communication speed from the propagation environment information of the radio propagation channel between itself and the base station. In the present embodiment, the connected base station may be different even at the same position as shown in FIG. 4A. In the present embodiment, the communication speed is calculated separately for each different base station when the base station is different even at the same position. That is, when there are the base station A (corresponding to a first external communication device) and the base station B (corresponding to a second external communication device), the communication speed calculation unit 206 calculates the communication speed (corresponding to a first communication speed) from the propagation environment information (corresponding to a first propagation environment information) of the radio propagation channel between itself and the base station A, and calculates the communication speed (corresponding to a second communication speed) from the propagation environment information (corresponding to a second propagation environment information) of the radio propagation channel between itself and the base station B.

As a calculating method of the communication speed, the downlink communication speed and the uplink communication speed corresponding to the range to which the strength (RSRP) of each probe information belongs are obtained from a preliminarily prepared table showing relationships between the strength (RSRP) as the propagation environment information and the communication speed as shown in FIG. 4B. In this example, RSRP is used as the radio wave strength. However, another propagation environment information such as SINR and RSSI may be used. Instead of using a table, the communication speed may be determined by a predetermined calculation.

When there are multiple pieces of probe information for the same position and the same base station, the communication speed may be summarized into one piece of information for a specific position and a specific base station by performing a statistical processing. Statistical methods include, but are not limited to, finding the mean, median, and variance. In FIG. 4A, the communication speed (1.5 Mbps) for the position p and the base station A is the average value of the communication speeds of seven samples when there are seven samples connected with the base station A at the position p. Further, the communication speed (0.9 Mbps) for the position p and the base station B is the average value of the communication speeds of three samples when there are three samples connected with the base station B at the position p. Alternatively, the statistical processing may be performed on the propagation environment information before calculating the communication speed, and the communication speed may be obtained from the result of the statistical processing.

The same position may not be exactly the same position but a certain range around the reference position. In the present embodiment, the probe information for the same position is the probe information in a certain range around a grid point on a map, which is set in advance based on the map information and locating accuracy. For example, the grid point interval is 10 m when the locating accuracy is more than 1 m, and the grid point interval is 1 m when the locating accuracy is between 10 cm and 1 m. In the present embodiment, the grid point is the reference position. That is, the positions shown in FIG. 4A correspond to reference positions.

The communication delay calculation unit 207 is configured to read the probe information stored in the probe information storage unit 202 and calculate the communication delay value from the propagation environment information of the radio propagation channel between itself and the base station. The communication delay calculation unit 207 is configured to calculate the communication delay value for each base station. That is, when there are the base station A (corresponding to a first external communication device) and the base station B (corresponding to a second external communication device), the communication delay calculation unit 207 calculates the communication delay value (corresponding to a first communication delay value) from the propagation environment information (corresponding to a first propagation environment information) of the radio propagation channel between itself and the base station A, and calculates the communication delay value (corresponding to a second communication delay value) from the propagation environment information (corresponding to a second propagation environment information) of the radio propagation channel between itself and the base station B.

The communication delay value may be End-to-End delay. For example, the communication delay value of the present embodiment may be the communication delay value between the probe information transmitter 100 which is a probe vehicle and the radio wave map generator 200, or the communication delay value between the probe information transmitter 100 and the base station. In this case, in downlink communication, the communication delay value may be calculated from the difference between the reception time and the transmission time information contained in the downlink packet, for example. In uplink communication, the communication delay value may be measured or calculated using Ack of TCP communication or RTT of PING. Information required to obtain the communication delay value is transmitted by the probe information transmitter 100 as the propagation environment information and stored in the probe information storage unit 202. Alternatively, as in the case of obtaining the communication speed, the uplink delay value and the downlink delay value corresponding to the range to which the radio wave strength of each probe information belongs may be obtained from prepared table showing the relationship between the radio wave strength and the communication delay value.

It may be desirable to summarize the communication delay values into one piece of information for a specific position and a specific base station by performing statistical processing. In FIG. 4A, the communication delay value (100 ms) for the position p and the base station A is the average value of the communication delay values of seven samples when there are seven samples connected with the base station A at the position p. Further, the communication delay value (150 ms) for the position p and the base station B is the average value of the communication delay values of three samples when there are three samples connected with the base station B at the position p.

The connection probability calculation unit 208 is configured to read the probe information stored in the probe information storage unit 202 and calculate connection probability, which is the probability of wireless communication with the base station at a specific position. The connection probability calculation unit 208 is also configured to calculate the connection probability for each base station. That is, a probability of the wireless communication with the base station A (corresponding to "first connection probability") and a probability of the wireless communication with the base station B (corresponding to "second connection probability") for the same position. For example, in FIG. 4A, when there are 10 samples connected with the base station at the position p, 7 samples connected with the base station A, 3 samples connected with the base station B, the connection probability for the base station A is 0.7 and the connection probability for the base station B is 0.3.

The radio wave map storage unit 204 is configured to store, as the radio wave map, the probe information and the calculation results of the communication speed calculation unit 206, the communication delay calculation unit 207, and the connection probability calculation unit 208. In an example shown in FIG. 4A, time, connected base station (corresponding to "external communication device identification information"), communication speed (corresponding to "first communication speed" and "second communication speed"), communication delay value (corresponding to "first communication delay value" and "second communication delay value"), and connection probability for base station (corresponding to "first connection probability" and "second connection probability").

The probe information may be read out from the probe information storage unit 202 to perform statistical processing, and the frequency of the calculation of the communication speed, the communication delay value, and the connection probability may be set as appropriate. For example, when the processing is performed every day, probe information received that day may be read from the probe information storage unit 202 at a fixed time of day to generate the radio wave map. When the radio wave map is updated over a longer span of time, such as once a day, it is possible to prevent the coexistence of old radio wave map before the update timing and new radio wave maps after the update timing in the radio wave map acquiring device 150 which is a user of the radio wave map. The processing may be performed each time the receiving unit 201 receives the probe information.

The radio wave map in the radio wave map storage unit 204 may be newly generated for each processing after deleting the existing radio wave map. The radio wave map may be generated by performing processing including the existing radio wave map to update the radio wave map. That is, although the term "generate" is used in the present embodiment, "generate" is a concept that includes updating.

In the present embodiment, the radio wave map is generated after specifying the base station as shown in FIG. 4A. However, the radio wave map may be generated after specifying the band information of the base station. According to this, accurate information can be generated at the level of band information.

In the above description, an example where two base stations A, B exist is explained. However, there may be three connectable base station for the same position such as position r shown in FIG. 4A. When there are three or more base stations and any two of them are selected, the same processing as described above is performed.

According to the radio wave map generator 200 of the present embodiment, since the external communication device identification information identifying the external communication device is received to generate the radio wave map, the radio wave map containing accurate information for each connectable base station can be generated. According to the radio wave map generator 200 of the present embodiment, since the communication speed, the communication delay value, and the connection probability, the minimum guaranteed values and the expectations of the communication speed and the communication delay value can be easily calculated.

Next, blocks used in the radio wave map provider device 250 will be described. The radio wave map storage unit 204 stores the radio wave map containing the communication speed, the communication delay value, and the connection probability as explained for the radio wave map generator 200.

The receiving unit 201 is configured to receive, from the radio wave map acquiring device 150, the radio wave map request containing the request position indicating the position requested, and the usage information indicating the usage of the radio wave map. The radio wave map request used in the present embodiment is the same as explained in (2). The usage information is the real-time communication flag in the present embodiment, which is 1 when it indicates the real-time communication and 0 when it indicates the non-real-time communication.

The minimum guaranteed speed calculation unit 209, the expected speed calculation unit 210, the maximum guaranteed communication delay calculation unit 211, and the expected communication delay calculation unit 212 are explained with reference to FIGS. 4A and 5. FIG. 5 is a diagram illustrating the radio wave map provided by the radio wave map provider device 250. FIG. 5A is a radio wave map provided when the usage information indicates real-time communication, and FIG. 5B is a radio wave map provided when the usage information indicates non-real-time communication.

When the usage information received by the receiving unit 201 indicates real-time communication, the minimum guaranteed speed calculation unit 209 calculates the minimum guaranteed speed information by selecting the smaller one of the first communication speed and the second communication speed at the reference position corresponding to the request position information received by the receiving unit 201. In the case of the radio wave map shown in FIG. 4A, the communication speed (0.9 Mbps) with the base station B which is the smaller one at the position p is selected as shown in FIG. 5A. Here, "indicate" may be used to directly indicate the usage, or to indicate other than the usage as long as the usage can be specified. Also, "corresponding to the request position information" means being at or near the position indicated by the request position information.

The minimum guaranteed communication speed is a minimum communication speed guaranteed at a particular point. That is, communication planning can be based on the worst communication conditions by using the minimum guaranteed communication speed. Accordingly, the information acquired from the vehicle can be used for the remote vehicle monitoring system which requires real-time information, for example.

When the usage information received by the receiving unit 201 indicates non-real-time communication, the expected speed calculation unit 210 calculates the expected speed information that is an expected value of the communication speed by using the first connection probability, the second connection probability, the first communication speed, and the second communication speed at the reference position corresponding to the request position information received by the receiving unit 201. In the case of the radio wave map shown in FIG. 4A, the expected speed as follows by using the communication speed and the connection probability for the base station A at the position p, and the communication speed and the connection probability for the base station B at the position p.

$$1.5 \text{ Mbps} \times 0.7 + 0.9 \text{ Mbps} \times 0.3 = 1.3 \text{ Mbps}$$

Here, "non-real-time communication" means excluding real-time communication, and may be all or part other than the real-time communication.

The expected speed is a communication speed normally expected at a particular point. That is, the expected speed allows communication planning using the average available communication speed. Accordingly, the expected speed can be used for the big data transmission program configured to determining the timing for transmitting big data, for example.

When the usage information received by the receiving unit 201 indicates real-time communication, the maximum guaranteed communication delay calculation unit 211 calculates the maximum guaranteed delay information by selecting the greater one of the first communication delay value and the second communication delay value at the reference position corresponding to the request position information received by the receiving unit 201. In the case of the radio wave map shown in FIG. 4A, the communication delay value (150 ms) with the base station B which is the greater one at the position p is selected as shown in FIG. 5A.

When the usage information received by the receiving unit 201 indicates non-real-time communication, the expected communication delay calculation unit 212 calculates the expected communication delay information that is an expected value of the communication delay by using the first connection probability, the second connection probability, the first communication delay value, and the second communication delay value at the reference position corresponding to the request position information received by the receiving unit 201. In the case of the radio wave map shown in FIG. 4A, the expected communication delay value as follows by using the communication delay value and the connection probability for the base station A at the position p, and the communication delay value and the connection probability for the base station B at the position p.

$$100 \text{ ms} \times 0.7 + 150 \text{ ms} \times 0.3 = 115 \text{ ms}$$

When there is one connected base station at the position such as the position o or position q shown in the radio wave map of FIG. 4A, the communication speed and the communication delay value are the same at the positions o, q even when the calculations in the minimum guaranteed speed calculation unit 209, the expected speed calculation unit 210, the maximum guaranteed communication delay calculation unit 211, and the expected communication delay calculation unit 212 are performed. Accordingly, the communication speed and the communication delay value for the positions o, q may be output without the calculations.

When there are three or more connectable base stations at the position r in FIG. 4A, for example, the calculations may be performed for all of the base stations. In such a case, when any two base stations are selected, the calculations include the same calculation for the position p.

The transmission unit 205 is configured to transmit the radio wave map reply that contains (i) the minimum guaranteed speed information calculated by the minimum guaranteed speed calculation unit 209 or the expected speed information calculated by the expected communication delay calculation unit 210, and (ii) the maximum guaranteed delay information calculated by the maximum guaranteed communication delay calculation unit 211 or the expected communication delay information calculated by the expected communication delay calculation unit 212. The radio wave map reply used in the present embodiment is the same as explained in (2).

In the present embodiment, when the usage information indicates the real-time communication, the transmission unit 205 transmits the minimum guaranteed value, that is, the minimum guaranteed speed information and/or the maximum guaranteed delay information. When the usage information indicates the non-real-time communication, the transmission unit 205 transmits the expected value, that is, the expected communication speed information and/or the expected communication delay information. The combination can be changed based on the type of the application 107 of the radio wave map acquiring device 150 and the contents of the radio wave map request. For example, in the case of automated driving control requiring the real-time communication, the communication delay is more important than the communication speed. When the usage information indicates the real-time communication, the transmission unit 205 transmits the maximum guaranteed delay information. In the video data or sensing data transmission which are non-real-time communication, the communication speed is more important than the communication delay. When the usage information indicates the non-real-time communication, the transmission unit 205 transmits the expected speed information.

According to the radio wave map provider device 250 of the present embodiment, since the minimum guaranteed speed information or the expected speed information is selectively transmitted depending on the usage information contained in the radio wave map request, the information suitable for the usage of the radio wave map can be provided.

Figure 6:
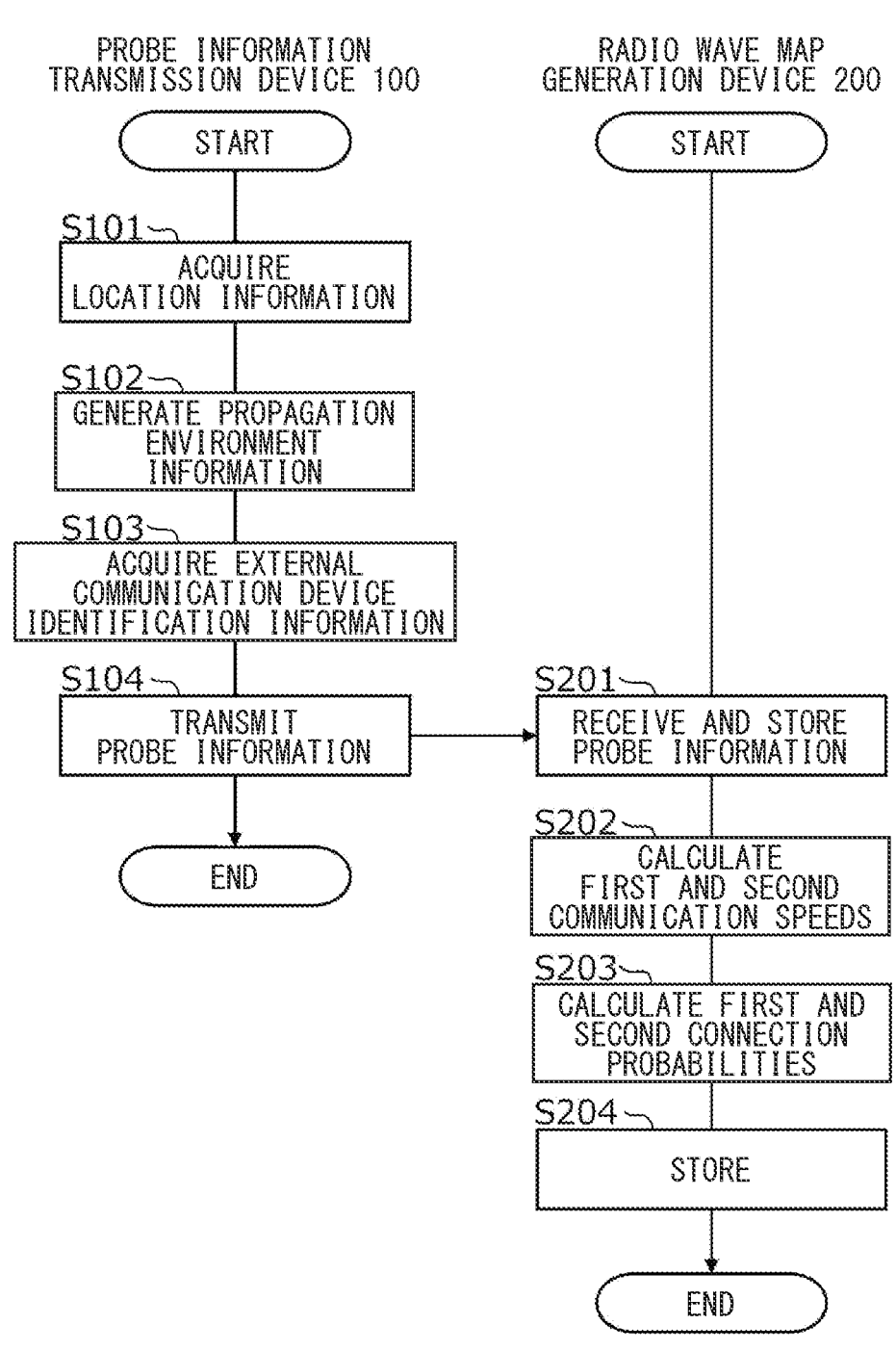
FIG. 6 is a flowchart showing operations of the probe information transmitter and the radio wave map generator according to the embodiment of the present disclosure.

(4) Operations of the Probe Information Transmitter 100 and the Radio Wave Map Generator 200 in the Radio Wave Map Generation Process The probe information transmitter 100 and the radio wave map generator 200 involves in generating the radio wave map. The operations of the probe information transmitter 100 and the radio wave map generator 200 in the radio wave map generation process of the present embodiment will be described with reference to the flowchart shown in FIG. 6. The following operations not only show the probe information transmission method executed by the probe information transmitter 100, but also the processing procedures of the probe information transmission program that can be executed by the probe information transmitter 100. The following operations not only show the radio wave map generation method executed by the radio wave map generator 200, but also the processing procedures of the radio wave map generation program that can be executed by the radio wave map generator 200. The order of the processes is not limited to the example shown in FIG. 6. That is, the order may be swapped as long as there is no restriction, such as a relationship where one step uses the result of the step before it.

The location information acquiring unit 101 of the probe information transmitter 100 acquires the location information indicating the current position of the vehicle (S101). The propagation environment information acquiring unit 103 acquires the propagation environment information of the radio propagation channel used in the wireless communication performed with the external communication device at the current position (S102). The propagation environment information acquiring unit 103 acquires the external communication device identification information identifying the external communication device (S103). The transmission unit 105 transmits, as the probe information to the radio wave map generator 200, the propagation environment information acquired in S102 and the external communication device identification information acquired in S103.

The receiving unit 201 of the radio wave map generator 200 receives pieces of probe information and stores the probe information in the probe information storage unit 202 (S201). The probe information contains the location information indicating the vehicle position, the propagation environment information of the radio propagation channel used for the wireless communication between the vehicle and the external communication device at the position indicated by the location information, and the external communication device identification information identifying the external communication device. When the wireless communication is performed with the first external communication device and the second external communication device at the position indicated by the location information based on the pieces of probe information, the communication speed calculation unit 206 calculates (i) the first communication speed from the first propagation environment information that is the propagation environment information of the radio propagation channel between itself and the first external communication device, and (ii) the second communication speed from the second propagation environment information that is the propagation environment information of the radio propagation channel between itself and the second external communication device (S202). The connection probability calculation unit 208 calculates (i) the first connection probability that is a probability of wireless communication with the first external communication device, and (ii) the second connection probability that is a probability of wireless communication with the second external communication device at the position indicated by the location information (S203). The radio wave map storage unit 204 stores the location information and the external communication device identification information received in S201, the first communication speed and the second communication speed calculated in S202, and the first connection probability and the second connection probability calculated in S203 (S204).

Figure 7:
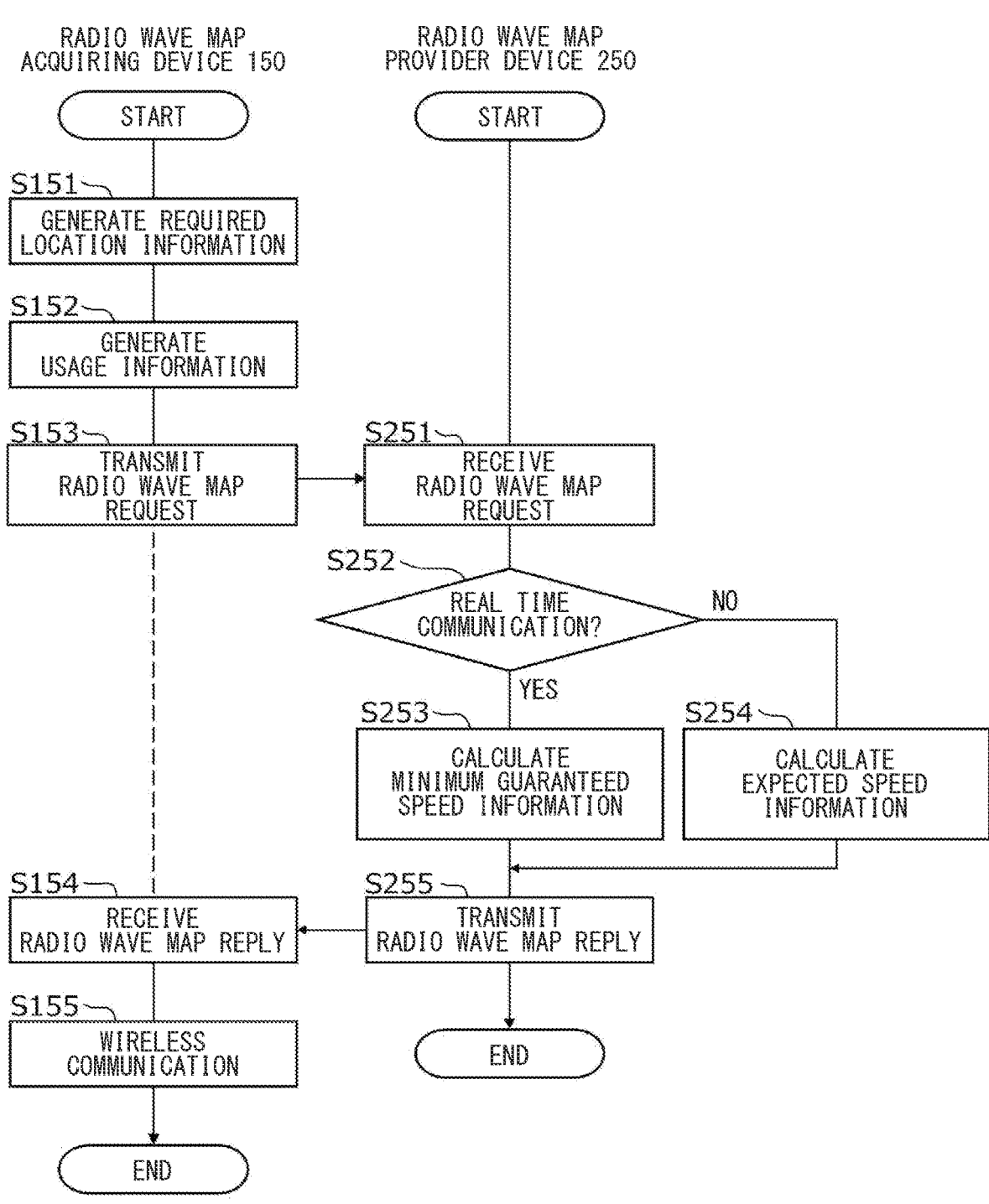
FIG. 7 is a flowchart showing operations of the radio wave map acquiring device and the radio wave map provider device according to the embodiment of the present disclosure.

(5) Operations of the Radio Wave Map Provider Device 250 and the Radio Wave Map Acquiring Device 150 in the Radio Wave Map Using Process The radio wave map provider device 250 and the radio wave map acquiring device 150 involve in using the radio wave map. The operations of the radio wave map provider device 250 and the radio wave map acquiring device 150 in the radio wave map using process of the present embodiment will be described with reference to the flowchart shown in FIG. 7. The following operations not only show the radio wave map providing method executed by the radio wave map provider device 250, but also show a processing procedure of the radio wave map providing program that can be executed by the radio wave map provider device 250. The following operations not only show the radio wave map acquiring/using method executed by the radio wave map acquiring device 150, but also the processing procedures of the radio wave map acquiring/using program that can be executed by the radio wave map acquiring device 150. These processes are not limited to the order illustrated in FIG. 7. That is, the order may be swapped as long as there is no restriction, such as a relationship where one step uses the result of the step before it.

The request position information generating unit 110 of the radio wave map acquiring device 150 determines the request position and generates the request position information (S151). The usage information generation unit 111 is configured to generate usage information indicating the usage of the radio wave map (S152). The transmission unit 105 transmits the radio wave map request containing the request position information generated in S151 and the usage information generated in S152 to the radio wave map provider device 250 (S153).

The receiving unit 201 of the radio wave map provider device 250 receives, from the radio wave map acquiring device 150, the radio wave map request containing the request position indicating the position requested, and the usage information indicating the usage of the radio wave map (S251). The control unit 203 determines whether the usage information contained in the radio wave map request indicates the real-time communication. When the usage information indicates the real-time communication (S252: Yes), the smaller one of the first communication speed and the second communication speed for the reference position corresponding to the request position information is selected as the minimum guaranteed speed information (S253). When the usage information indicates the non-real-time communication (S252: No), the expected speed information that is the expected value of the communication speed is calculated using the first connection probability, the second connection probability, the first communication speed, and the second communication speed for the reference position corresponding to the request position information (S254). The transmission unit 205 transmits radio wave map reply contains the minimum guaranteed speed information acquired in S253 or the expected speed information acquired in S254 (S255).

The receiving unit 106 of the radio wave map acquiring device 150 receives the radio wave map reply from the radio wave map provider device 250 (S154). The wireless communication with the external communication device is performed based on the radio wave map reply received in S154 (S155). For example, the vehicle information collected by the vehicle is transmitted to the external communication device by executing the application 107.

2. General Overview

The features of the probe information transmitter, the radio wave map generator, the radio wave map provider device, and the radio wave map acquiring device according to the embodiment of the present disclosure have been described above.

Terms used in the description of each embodiment are examples and may be replaced with synonymous terms or terms having a synonymous function.

The block diagram used in the description of each embodiment is a diagram in which the configurations of devices and the like are classified and organized by function. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms first, second, and N-th (N is an integer) used in each embodiment and the claims are used to distinguish two or more configurations of the same type and two or more methods of the same type and do not limit the order and superiority and inferiority.

Although each embodiment is premised on the probe information transmitter and the radio wave map acquiring device mounted on the vehicles, the present disclosure includes dedicated or general-purpose communication terminal devices other than communication terminal devices for vehicles, unless otherwise limited in the claims.

In the above-described embodiment, the probe information transmitter and the radio wave map acquiring device are mounted on a vehicle. However, the devices may be carried by a pedestrian.

Further, examples of forms of the device of the present disclosure include the following. Examples of a form of a component include a semiconductor element, an electronic circuit, a module, and a microcomputer. Examples of a form of a semifinished product include an electronic control device (electronic control unit (ECU)) and a system board. Examples of a form of a finished product include a cellular phone, a smartphone, a tablet computer, a personal computer (PC), a workstation, and a server. Further, the security management device may be a device having a communication function such as a video camera, a still camera, a car navigation system.

Each device may additionally include necessary functions such as an antenna and a communication interface.

The radio wave map generator and the radio wave map providing device of the present disclosure are assumed to be used for the purpose of providing various services. In conjunction with providing such services, the device of the present disclosure may be used, the method of the present disclosure may be used, or/and the program of the present disclosure may be executed.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. As a result, it is possible to provide a latest function by updating the program.

What is claimed is:

1. A radio wave map generator device configured to receive probe information from a probe information transmitter device mounted in a vehicle and generate a radio wave map, the radio wave map generator device comprising
   at least one of (i) a circuit and (ii) a processor with a memory storing computer program code executable by the processor, the at least one of the circuit and the processor configured to cause the radio wave map generator device to implement:
   a receiving unit configured to receive pieces of the probe information each of which contains
      location information indicating a position of the vehicle, which is a reference position corresponding to a grid point on a map,
      propagation environment information of a radio propagation channel used for wireless communication between the vehicle and an external communication device at the position, and
      external communication device identification information identifying the external communication device;
   a communication speed calculation unit configured to calculate, based on the pieces of the probe information when the external communication device which communicates with the vehicle at the position is a first external communication device and a second external communication device,
      a first communication speed from first propagation environment information that is the propagation environment information of the radio propagation channel between the vehicle and the first external communication device, and
      a second communication speed from second propagation environment information that is the propagation environment information of the radio propagation channel between the vehicle and the second external communication device;
   a connection probability calculation unit configured to calculate, based on the pieces of the probe information,
      a first connection probability that is a probability of performing wireless communication with the first external communication device at the position, and
      a second connection probability that is a probability of performing wireless communication with the second external communication device at the position; and
   a radio wave map storage unit configured to store a radio wave map including the location information, the external communication device identification information, the first communication speed, the second communication speed, the first connection probability, and the second connection probability, and minimum guaranteed speed information for a reference position corresponding to request position information.

2. The radio wave map generator device according to claim 1, further comprising:

a communication delay calculation unit configured to calculate, based on the pieces of the probe information,
a first communication delay value for the position from the first propagation environment information, and
a second communication delay value for the position from the second propagation environment information, wherein
the radio wave map storage unit is configured to further store the first communication delay value and the second communication delay value.

3. A radio wave map provider device configured to receive a radio wave map request from a radio wave map acquiring device mounted in a moving body, and transmit required information, the radio wave map provider device comprising
at least one of (i) a circuit and (ii) a processor with a memory storing computer program code executable by the processor, the at least one of the circuit and the processor configured to cause the radio wave map provider device to implement:
a radio wave map storage unit configured to store
reference position information indicating a reference position,
a first communication speed that is a communication speed between a moving body and a first external communication device at the reference position,
a second communication speed that is a communication speed between the moving body and a second external communication device at the reference position,
a first connection probability that is a probability of performing wireless communication with the first external communication device at the reference position, and
a second connection probability that is a probability of performing wireless communication with the second external communication device at the reference position;
a receiving unit configured to receive the radio wave map request that contains request position information indicating a request position and usage information indicating a usage of the radio wave map;
a minimum guaranteed speed calculation unit configured to select, as minimum guaranteed speed information, a smaller one of the first communication speed and the second communication speed for the reference position corresponding to the request position information when the usage information indicates real-time communication;
an expected speed calculation unit configured to calculate, when the usage information indicates non-real-time communication other than the real-time communication, expected speed information that is an expected value of the communication speed using the first connection probability, the second connection probability, the first communication speed, and the second communication speed for the reference position corresponding to the request position information; and
a transmission unit configured to transmit a radio wave map reply that contains the minimum guaranteed speed information or the expected speed information.

4. The radio wave map provider device according to claim 3, wherein
the radio wave map storage unit is configured to store
a first communication delay value that is a communication delay value between the moving body and the first external communication device at the reference position, and a second communication delay value that is a communication delay value between the moving body and the second external communication device at the reference position,
the radio wave map provider device further comprising:
a maximum guaranteed communication delay calculation unit configured to select, as maximum guaranteed delay information, a greater one of the first communication delay value and the second communication delay value for the reference position corresponding to the request position information when the usage information indicates real-time communication; and
an expected communication delay calculation unit configured to calculate, when the usage information indicates non-real-time communication other than the real-time communication, expected communication delay information that is an expected value of communication delay using the first connection probability, the second connection probability, the first communication delay value, and the second communication delay value for the reference position corresponding to the request position information, wherein
the transmission unit is configured to transmit the radio wave map reply containing the maximum guaranteed delay information or the expected communication delay information.

5. A radio wave map acquiring device mounted in a vehicle, the radio wave map acquiring device comprising
at least one of (i) a circuit and (ii) a processor with a memory storing computer program code executable by the processor, the at least one of the circuit and the processor configured to cause the radio wave map acquiring device to implement:
a request position information generating unit configured to determine a request position and generate request position information;
a usage information generation unit configured to generate usage information indicating usage of a radio wave map;
a transmission unit configured to transmit, to a radio wave map provider device, a radio wave map request that contains the request position information and the usage information;
a receiving unit configured to receive, from the radio wave map provider device,
a radio wave map reply that contains minimum guaranteed speed information for a reference position corresponding to the request position information when the usage information indicates real-time communication, and
the radio wave map reply that contains expected speed information for the reference position corresponding to the request position information when the usage information indicates non-real-time communication other than the real-time communication; and
a wireless communication unit configured to perform wireless communication with an external communication device based on the minimum guaranteed speed information contained in the radio wave map reply.

6. The radio wave map acquiring device according to claim 5 wherein,
the receiving unit is configured to receive, from the radio wave map provider device,
the radio wave map reply that contains maximum guaranteed delay information for the reference position corresponding to the request position information when the usage information indicates real-time communication, and the radio wave map reply that contains expected communication delay information for the reference position corresponding to the request position information when the usage information indicates non-real-time communication other than the real-time communication, and the wireless communication unit is configured to perform wireless communication with the external communication device based on the maximum guaranteed delay information or the expected communication delay information contained in the radio wave map reply.

7. The radio wave map acquiring device according to claim 5, wherein the minimum guaranteed speed information is defined as a smallest value among communication speeds calculated for a plurality of connectable base stations at the reference position corresponding to the request position information.

8. The radio wave map acquiring device according to claim 5, wherein the expected speed information is defined as a weighted average of communication speeds for a plurality of connectable base stations at the reference position, the weights being the connection probabilities for each base station.

9. A radio wave map acquiring device mounted in a vehicle, the radio wave map acquiring device comprising at least one of (i) a circuit and (ii) a processor with a memory storing computer program code executable by the processor, the at least one of the circuit and the processor configured to cause the radio wave map acquiring device to implement:

a request position information generating unit configured to determine a request position and generate request position information;

a usage information generation unit configured to generate usage information indicating usage of a radio wave map;

a transmission unit configured to transmit, to a radio wave map provider device, a radio wave map request that contains the request position information and the usage information;

a receiving unit configured to receive, from the radio wave map provider device, a radio wave map reply that contains minimum guaranteed speed information for a reference position corresponding to the request position information when the usage information indicates real-time communication, and the radio wave map reply that contains expected speed information for the reference position corresponding to the request position information when the usage information indicates non-real-time communication other than the real-time communication; and a wireless communication unit configured to perform wireless communication with an external communication device based on the minimum guaranteed speed information and the expected speed information contained in the radio wave map reply.

\* \* \* \* \*